(No Model.) 2 Sheets—Sheet 1.

C. C. FRICK & N. P. WOOD.
TWO WHEELED VEHICLE.

No. 448,015. Patented Mar. 10, 1891.

Witnesses:

Inventors.
Charles C. Frick
Nimrod P. Wood,
By their Attorneys,

THE NORRIS PETERS CO., PHOTO-LITHO., WASHINGTON, D. C.

(No Model.) 2 Sheets—Sheet 2.

C. C. FRICK & N. P. WOOD.
TWO WHEELED VEHICLE.

No. 448,015. Patented Mar. 10, 1891.

Witnesses

Inventors
Charles P. Frick
Nimrod P. Wood,
By their Attorneys,

UNITED STATES PATENT OFFICE.

CHARLES C. FRICK AND NIMROD P. WOOD, OF BLUE SPRINGS, MISSOURI.

TWO-WHEELED VEHICLE.

SPECIFICATION forming part of Letters Patent No. 448,015, dated March 10, 1891.

Application filed May 28, 1890. Serial No. 353,454. (No model.)

*To all whom it may concern:*

Be it known that we, CHARLES C. FRICK and NIMROD P. WOOD, citizens of the United States, residing at Blue Springs, in the county of Jackson and State of Missouri, have invented a new and useful Two-Wheeled Vehicle, of which the following is a specification.

The invention relates to improvements in two-wheeled vehicles.

The object of the present invention is to provide a simple and inexpensive vehicle adapted to readily have attached to it either a pole or shafts and capable of adjustment to regulate the seat for either one or the other or for large or small animals.

A further object of the invention is to provide a vehicle in which the seat can be adjusted backward and forward over the axle to balance the seat and vehicle for light and heavy persons.

The invention consists in the construction and novel combination and arrangement of parts hereinafter fully described, illustrated in the accompanying drawings, and particularly pointed out in the claims.

Figure 1:
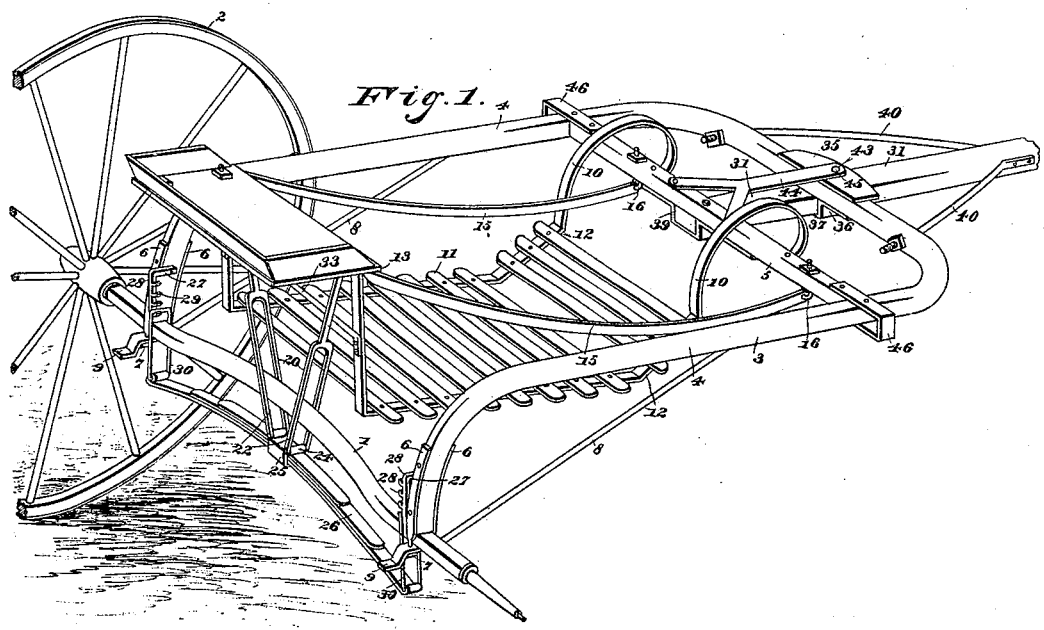
Figure 2:
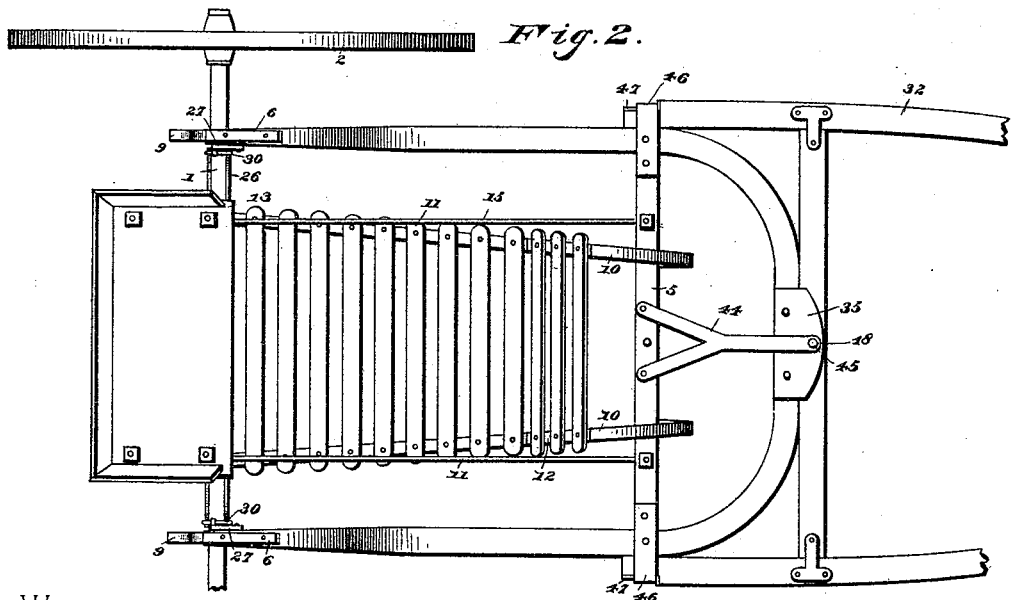
Figure 3:
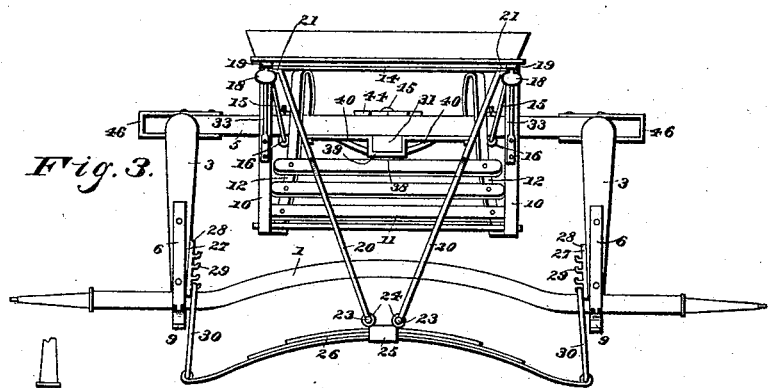
Figure 4:
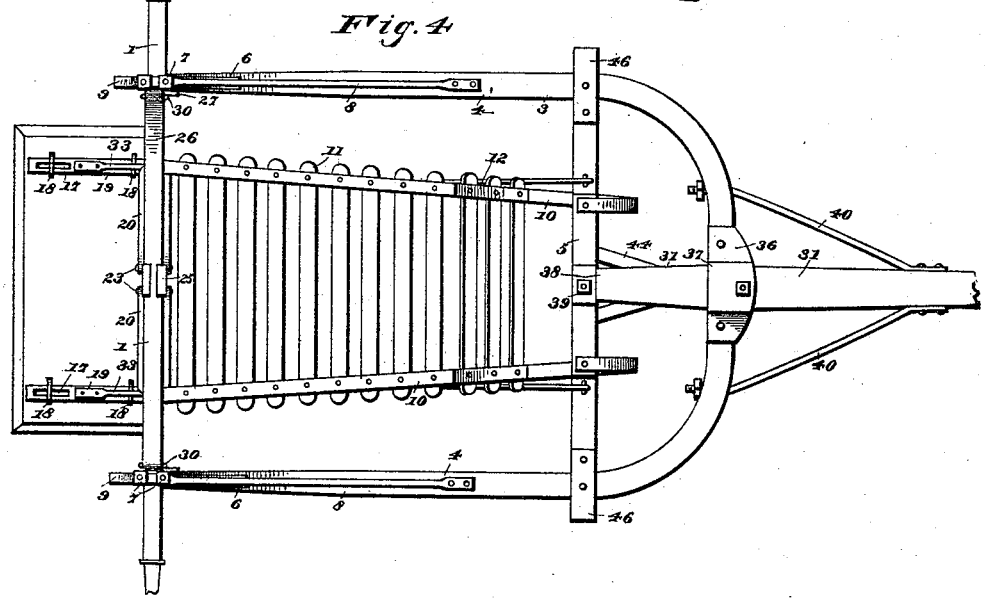
Figure 5:
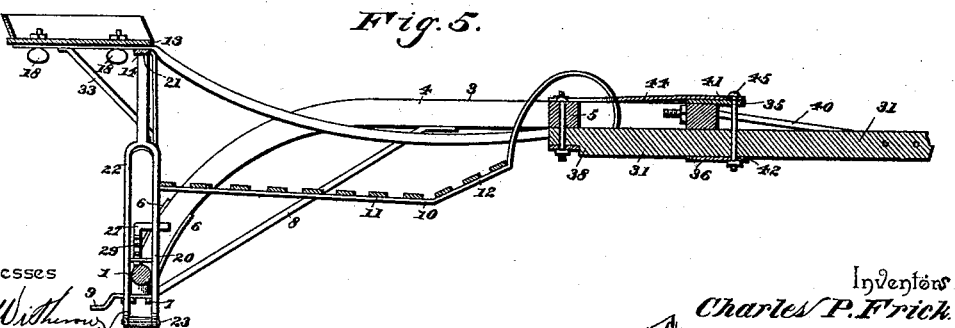

In the drawings, Figure 1 is a perspective view of a road-cart constructed in accordance with this invention, the pole being shown in position. Fig. 2 is a plan view, the shafts being shown in position. Fig. 3 is a rear elevation, the parts being in position shown in Fig. 1. Fig. 4 is a reverse plan view. Fig. 5 is a central vertical longitudinal sectional view.

Referring to the accompanying drawings, 1 designates an axle mounted upon wheels 2, and having secured to it the rear ends of a frame 3, that is constructed of a single piece and curved around the front of the vehicle, and having its sides 4 connected by a cross-bar 5, and the rear end, which is secured to the axle, is curved downward and provided upon its front and rear faces with plates 6, having their lower ends threaded and provided with nuts 7, that secure the rear end of a brace-rod 8 beneath the axle 1, and the axle is arranged between the brace-rod, which is flattened at this point, and the ends of the frame. The end of the brace 8 is extended rearward to provide a step 9, and the front end of the brace is secured to the lower face of the side of the frame.

Secured to the cross-bar 5, intermediate of the ends of the same, are the front ends of the bottom bars 10, to which slats 11 are secured, which form the bottom of the vehicle. The bottom bars 10 are curved up over the cross-bar 5 to give them a certain amount of spring, and are inclined at 12 and extend rearward to the axle, where they rise vertically, and are secured to the front edge of the seat 13 by a bar 14, formed integral with the bottom bars. The seat is connected with the cross-bar by curved side bars 15, constructed of spring metal and having their front end provided with perforations and secured to the cross-bar 5 by eyebolts 16, making a flexible connection, and the rear ends of the curved side bars are extended along the lower seat and provided with longitudinal slots 17, and are secured to the seat by thumb-screws 18. The longitudinal slots enable the seat to be adjusted along the rear horizontal portions 19 of the curved side bars 15 to adapt the vehicle for heavy and light persons. The seat is supported by standards 20, having their upper ends 21 bolted or similarly secured to the cross-bar 14 and provided with forked arms 22, which straddle the axle and have their lower ends provided with perforations, through which pass pintles 23, that hinge the forked arms or bifurcated portion of the standards to eyes 24 of a clip 25, that is centrally secured to a main leaf-spring 26. The leaf-spring 26 is provided at its ends with eyes, in which are arranged links 30, that encircle the axle and engage brackets 27, that are L-shaped, and are secured to the downwardly-curved ends of the sides of the frame and have their vertical portions 28 provided with a series of hooks or projections 29, adapted to be engaged by the links 30 to adjust the spring and consequently the seat vertically to adapt the vehicle to different-sized animals and to a pole 31 and shafts 32. When the pole 31 is used, the front of the vehicle is considerably lower than it is when the shafts are employed, since the pole is arranged below the breasts of the animals and the shafts are arranged high up upon their sides, and the seat must be adjusted vertically, or otherwise it is impossible to employ both shafts and pole to the same vehicle.

The seat is braced by rods 33, extending from the vertical portion of the seat-bars to the lower face of the seat. By hinging the standards to the leaf-spring the seat is capable of lateral motion and the openings 34 permit the seat to move vertically without contacting with the axle and at the same time enable the seat to be supported over the axle, and the vehicle is adapted to pass over rough and uneven roads without jarring the occupant.

The front of the frame 3 is provided with plates 35 and 36, arranged upon the upper and lower faces of the frame, and the latter one 36 is provided with a loop or rectangular bend 37 to provide a keeper for the rear portion of the tongue 31, and the rear end 38 is shouldered and secured by a keeper-plate 39, attached to the lower face of the cross-bar, and the said tongue is further braced and supported by the side rods 40, that have their front ends bolted upon opposite sides of the tongue and the rear ends threaded and secured by bolts to the front portion of the frame. The plates 35 and 36 are extended beyond the frame and are provided with perforations 41 and 42, which register with a perforation 43 of a brace 44, having its rear end provided with diverging portions that are secured to the cross-bar, and the tongue is secured in the keeper of the plate 36 by a pin 45, which passes through the registering perforations before described, and in order to further secure the tongue a similar pin may be employed to pass through the cross-bar and the rear end of the tongue. The ends of the cross-bar are provided with straps 46, which form keepers adapted for the reception of the ends of the shafts, and the said ends are shouldered and provided with stop-plates 47. The cross-bar of the shafts or thill is provided with a central perforation 48 to register with the perforations of the plates 35 and 36 and to receive the coupling-pin 45.

It will be seen that the vehicle can be readily adapted to be drawn by one or two horses and can be adjusted to suit animals of different heights, and can have its seat readily adjusted over the axle to adapt the vehicle for heavy or light persons.

From the foregoing description and the accompanying drawings the construction, operation, and advantages of the invention will be readily understood.

Having thus described our invention, we claim—

1. In a vehicle, the combination of the axle, the draft-frame secured to the axle, the seat, the bottom bars 10, secured to the seat and having their front ends formed into springs and attached to the front of the frame, the spring side bars rigidly secured to the seat and flexibly connected to the frame, the leaf-spring suspended below the axle, and the standards having their upper ends secured to the seat and their lower ends hinged to the leaf-spring transversely of the latter and provided with longitudinal openings to receive the axle, whereby the body of the vehicle will have lateral swing, substantially as described.

2. In a vehicle, the combination of the axle, the draft-frame, the seat arranged above the axle, the bottom bars 10, having their front ends secured to the lower face of the cross-bar of the frame and curved up over the same to form a spring and inclined at 12, and then extending rearwardly in a horizontal plane to the axle, and provided with the vertical portions connected by the integral cross-bar and secured to the seat, substantially as described.

3. In a vehicle, the combination of the draft-frame, the cross-bar 5, connecting the sides of the frame near the front end, the plates 35 and 36, secured to the front of the frame and provided with registering perforations, the metallic straps or keepers 46, serving as a means of attaching the cross-bar to the frame and projecting out beyond the sides of the frame to form loops to receive the ends of the shafts, the coupling-pin for the plates 35 and 36, and the keeper 39 on the cross-bar, whereby the frame is adapted to receive either a tongue or shafts, substantially as described.

4. In a vehicle, the combination of the axle, the draft-frame, the seat arranged above the axle, the bottom bars 10, having their front ends secured to the lower face of the cross-bar of the frame and curved up over the same to form springs and inclined at 12, and then extending rearwardly in a horizontal plane to the axle, and provided with the vertical portions connected by the integral cross-bar and secured to the seat, and the side bars 15, connected to the front of the frame and having their rear ends adjustably secured to the seat, substantially as described.

5. In a two-wheeled vehicle, the axle, the spring suspended therefrom, the seat, the standards 20, secured to the seat and hinged to the spring, so as to have lateral movement, the bottom bars 10 of the foot-board, having rear ends rigidly connected to the seat and their front ends formed into springs attached at their front ends to the frame, and the spring side bars 15, rigidly connected to the seat and flexibly connected at their front ends to the frame, substantially as described.

In testimony that we claim the foregoing as our own we have hereto affixed our signatures in presence of two witnesses.

CHARLES C. FRICK.
NIMROD P. WOOD.

Witnesses:
C. N. TIFFANY,
J. L. BRUSFIELD.